Patented Sept. 1, 1953

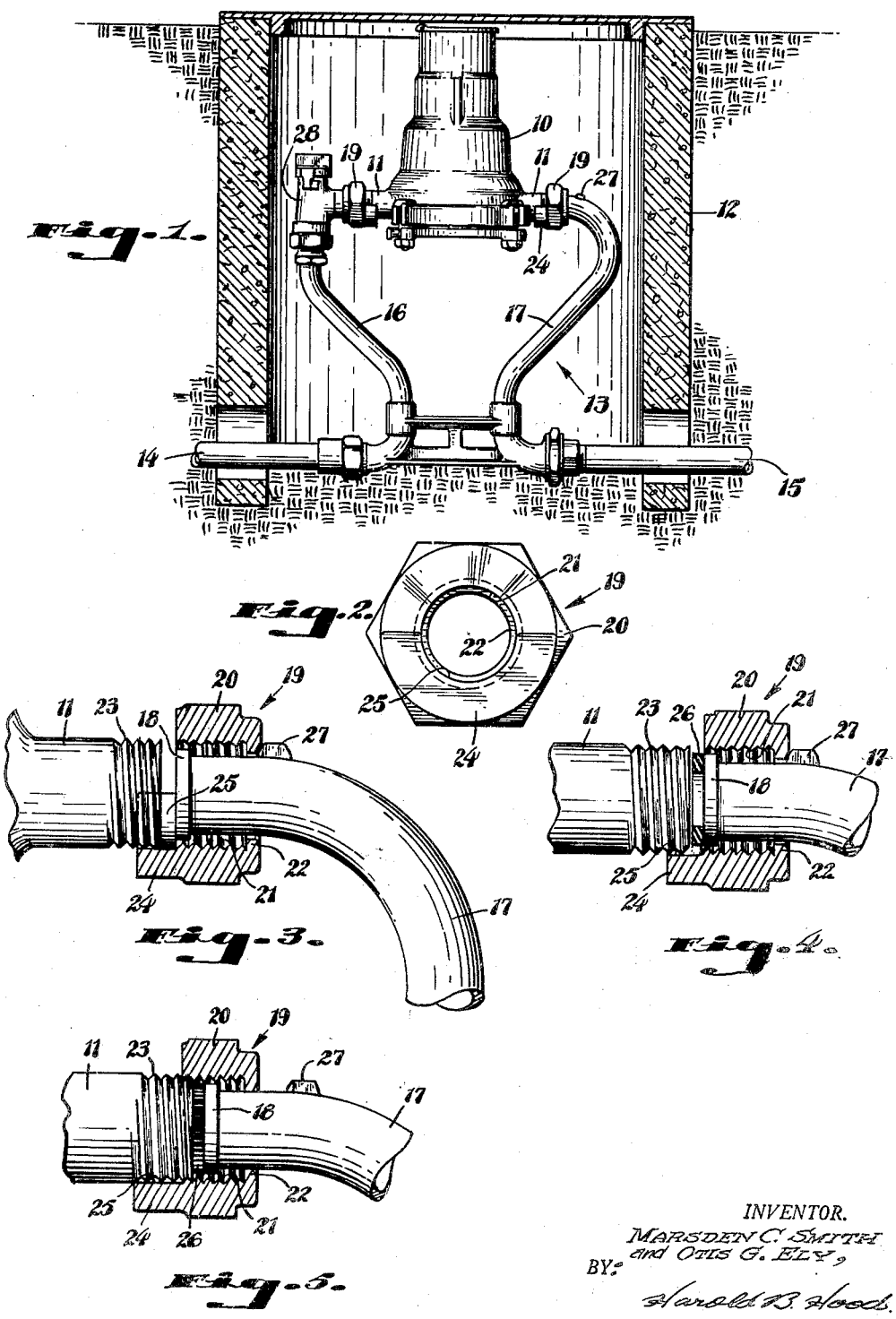

2,650,837

UNITED STATES PATENT OFFICE 2,650,837

SADDLE NUT AND COUPLING

Marsden C. Smith and Otis G. Ely, Richmond, Va., assignors to The Ford Meter Box Company, Inc., Wabash, Ind., a corporation of Indiana Application October 4, 1950, Serial No. 188,414

2 Claims. (Cl. 285—3)

The present invention relates to a saddle nut and a coupling utilizing such a nut. The invention finds its primary utility in the mounting of water meters and the like, and it has been illustrated, and will be described, in that environment, though it is to be understood that the invention is not limited thereto but may be used in other, analogous situations, as well.

The primary object of the invention is to provide a novel form of coupling nut, adapted to be sleeved on a conduit and embodying a saddle so proportioned and arranged as to support a threaded element to be coupled to such conduit, before engagement of the threads of said nut with such threaded element. Further objects of the invention will appear as the description proceeds.

To the accomplishment of the above and related objects, our invention may be embodied in the form illustrated in the accompanying drawings, attention being called to the fact, however, that the drawings are illustrative only, and that change may be made in the specific construction illustrated and described, so long as the scope of the appended claims is not violated.

Fig. 1 is a more or less diagrammatic view showing a conventional water meter located in a meter box, and mounted upon a meter setter equipped with nuts constructed in accordance with the present invention;

Fig. 2 is an end elevation, drawn to a larger scale, of a nut constructed in accordance with the present invention;

Fig. 3 is a longitudinal section through such a nut, shown in assembled relation with a conduit, and supporting a meter spud before association of a sealing washer therewith;

Fig. 4 is a similar view, showing the manner in which such a washer may be introduced, and will be sustained, in such an assembly, before the nut threads are engaged with the spud threads; and Fig. 5 is a similar view showing the relation of the parts as the nut enters threaded engagement with the spud.

Referring more particularly to the drawings, it will be seen that we have shown a conventional water meter 10, having inlet and outlet spuds 11, 11, disposed in a meter box 12, wherein it is supported, upon a meter setter, indicated generally by the reference numeral 13, in series connection between water supply pipes 14 and 15. The meter setter 13 comprises conduits 16 and 17 each of which carries, at one end, a coupling nut for connection to one of the meter spuds 11, 11.

As is shown in some detail in Figs. 3–5, each conduit 16 and 17 will be provided with a terminal, radially-outwardly-extending flange 18. In the illustrated embodiment of the invention, a valve fitting 28 is connected to form a part of conduit 16, and one arm of said fitting will be provided with a flange functionally equivalent to the flange 18. The conduit (or said arm) will be generally cylindrical, and our novel coupling nut, indicated generally by the reference numeral 19, will be sleeved on each such conduit behind said flange. As shown, said nut comprises a body 20 formed with an axial bore therethrough, the major portion of the length of said bore being provided with an internal thread 21.

The crest of the thread 21 has a diameter slightly greater than that of the flange 18, so that the threaded portion of the bore may move freely past said flange; but at its rear end, the bore is reduced in diameter to provide stop means 22, which may or may not be peripherally continuous, but which extends radially inwardly beyond the diameter of said flange 18 to cooperate with said flange to limit forward movement of said nut relative to said flange.

In accordance with conventional practice, the extremity of each spud 11 is formed with an external thread 23 for engagement with the thread 21 of the associated nut. At its forward end, each nut 19 is provided with an axially-forwardly projecting lip 24 formed to provide a part-cylindrical saddle surface 25 flush with the base of the thread 21 and having a peripheral extent of 180° or less. Preferably, we provide stop means 27 on the conduit 17 so spaced from the flange 18 that, when the nut stop means 22 engages the conduit stop means 27, the front end of the nut body 20 will be substantially in the plane of the flanged end of the conduit 17, and the lip 24 will extend substantially therebeyond, thus disposing the surface 25 to receive and support the meter spud 11.

The conduits 16 and 17 are relatively resiliently flexible, and, according to conventional practice, their facing, flanged ends are normally spaced apart a distance slightly greater than the distance between the oppositely facing ends of the spuds 11, 11 of a standard meter 10. The nuts 19, 19 being backed into their positions of full retraction, as suggested in Fig. 3, and being turned to locate the lips 24, 24 in their lowermost positions, a meter is lowered into the box 12 and its spuds are seated on the projecting saddle surfaces 25. Here, the meter will be supported in the manner suggested in Fig. 3. Now, a washer 26 can be dropped into the space between the flange 18 of conduit 17, for instance, and the adjacent end of the associated spud 11. Now, the nut 19 can be shifted toward the left, as viewed in Fig. 4, to engage the thread 21 with the thread 23, during which operation, the weight of the meter is sustained, and the washer 26 is held in proper alignment, by the lip 24. Since the surface 25 is flush with the base of the thread 23, the spud will be supported in proper alignment for engagement of the threads 21 and 23, substantially without attention from the operator. As is clearly suggested in Fig. 3 of the drawings, the distal terminus of the thread 21 is preferably so related to the saddle or lip 24 and to the distal terminus of the thread 23, that, when the saddle 24 is in its lowermost position and the nut 20 is moved into endwise engagement with the spud 11, the two threads will be "in phase" by which we mean that they will interengage immediately when turning movement of the nut is started.

When the parts have attained the relative positions of Fig. 5, a similar washer may be introduced between the other conduit and the other meter spud, and the other nut 19 may be engaged with such other meter spud. Thereafter, the two nuts will be turned up, substantially equally, on their respective spuds, to engage their respective stop means 22 with the respective flange means and to clamp the respective washers 26 sealingly in place. The lips 24, of course, act to sustain the weight of the meter throughout the setting thereof, thereby materially facilitating that operation.

We claim as our invention:

1. In combination, a generally-cylindrical conduit having a radially-outwardly-extending flange at one end thereof, a coupling nut sleeved on said conduit and comprising a body formed with an axial bore therethrough, said bore being formed with an internal thread whose crest diameter slightly exceeds the diameter of said flange, stop means at the rear end of said body projecting radially inwardly beyond the crest of said thread for cooperation with said flange to limit forward movement of said nut relative to said conduit, a single lip projecting axially from the forward end of said body and formed to provide a part-cylindrical saddle surface substantially flush with the base of said thread, said lip having a peripheral extent not exceeding 180°, and stop means on said conduit spaced rearwardly from said flange a distance substantially equal to the axial length of said nut body, said conduit stop means cooperating with said nut stop means to limit retraction of said nut to a position in which said lip projects substantially beyond the flanged end of said conduit.

2. In combination with a pair of spaced pipe ends arranged substantially on a common horizontal axis, each provided at its extremity facing the other with a radially-outwardly-extending flange, of a coupling nut sleeved on each of said pipe ends for rotation about said axis, each such nut comprising a body formed with an axial bore therethrough, each said bore being formed with an internal thread whose crest diameter slightly exceeds the diameter of the flange on the associated pipe end, stop means at that end of each body remote from the other nut and projecting radially inwardly beyond the crest of said thread for cooperation with the flange on the associated pipe end to limit movement of said nut relative to its associated pipe end toward the other pipe end, a single lip on each nut body projecting, from that end of said body nearer said other nut, toward said other nut, each such lip being formed to provide a part-cylindrical saddle surface substantially flush with the base of the thread of said nut, each lip having a peripheral extent not exceeding 180°, and a member formed with oppositely-projecting substantially aligned, externally-threaded end portions, said end portions being proportioned and designed to be supported respectively upon the saddle surfaces of said respective nut lips with said member spanning the space between said nut lips, the internal threads of said nuts being cooperatively engageable with the external threads of said member end portions, respectively, and the nut threads being "in phase" with said member end threads, respectively, when said lips are substantially in their lowermost positions of rotary adjustment relative to said pipe ends.

MARSDEN C. SMITH.
OTIS G. ELY.

References Cited in the file of this patent

UNITED STATES PATENTS

| Number | Name | Date |
|---|---|---|
| 454,690 | Westaway | June 23, 1891 |
| 974,651 | Ford | Nov. 1, 1910 |
| 1,154,944 | Tilly | Sept. 28, 1915 |
| 1,249,435 | Lofton | Dec. 11, 1917 |
| 1,310,400 | McNutt | July 15, 1919 |
| 1,345,124 | Calhoun | June 29, 1920 |
| 2,165,626 | Ford | July 11, 1939 |